(12) United States Patent
Galloway et al.

(10) Patent No.: US 7,298,055 B2
(45) Date of Patent: Nov. 20, 2007

(54) AUXILIARY POWER SUPPLY FOR A WIND TURBINE

(75) Inventors: Dudley L. Galloway, Jefferson City, MO (US); William J. Cimperman, Jr., Maple Grove, MN (US); James A. Grace, Rocky Gap, VA (US); John P. Stowe, Linn, MO (US); Stanley W. Guerrant, New Bloomfield, MO (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 11/182,618

(22) Filed: Jul. 15, 2005

(65) Prior Publication Data

US 2007/0013193 A1  Jan. 18, 2007

(51) Int. Cl.
*H02P 9/04* (2006.01)
(52) U.S. Cl. .................................................. 290/44
(58) Field of Classification Search ...................... None
See application file for complete search history.

(56) References Cited

U.S. PATENT DOCUMENTS

| | | | | |
|---|---|---|---|---|
| 1,815,842 A | * | 7/1931 | Gay | 307/18 |
| 2,106,557 A | * | 1/1938 | Putnam | 290/44 |
| 4,362,950 A | * | 12/1982 | Turner | 307/45 |
| 4,418,287 A | * | 11/1983 | Syverson | 290/44 |
| 5,898,556 A | * | 4/1999 | de Sedouy et al. | 361/37 |
| 6,437,996 B1 | * | 8/2002 | Wobben | 363/37 |
| 6,946,751 B2 | * | 9/2005 | Yoshida et al. | 290/44 |
| 7,057,305 B2 | * | 6/2006 | Kruger-Gotzmann et al. | 290/55 |
| 2004/0075278 A1 | * | 4/2004 | Canini et al. | 290/44 |
| 2004/0131467 A1 | * | 7/2004 | Wobben | 416/132 B |
| 2005/0046196 A1 | * | 3/2005 | Larsen | 290/44 |
| 2005/0230979 A1 | * | 10/2005 | Bywaters et al. | 290/44 |
| 2005/0242233 A1 | * | 11/2005 | Battisti | 244/58 |

FOREIGN PATENT DOCUMENTS

| | | | |
|---|---|---|---|
| CN | 1681177 A | * | 10/2005 |
| DE | 10013442 C1 | * | 10/2001 |
| DE | 10044262 A1 | * | 3/2002 |
| DE | 10234766 A1 | * | 2/2004 |
| EP | 536019 A1 | * | 4/1996 |
| EP | 1677007 A2 | * | 7/2006 |
| FR | 2730851 A1 | * | 8/1996 |
| JP | 04044380 A | * | 2/1992 |
| JP | 2003061396 A | * | 2/2003 |
| WO | WO 8909476 A1 | * | 10/1989 |
| WO | WO 2003081615 A1 | * | 10/2003 |
| WO | WO 2004092579 A1 | * | 10/2004 |

* cited by examiner

*Primary Examiner*—Joseph Waks
(74) *Attorney, Agent, or Firm*—Michael M. Rickin; Paul R. Katterle; Bryan A. Shang

(57) ABSTRACT

A wind turbine having a nacelle, a generator and a high voltage transformer which are connected to each other and are located inside the nacelle. The wind turbine is provided with a low voltage power supply source which is located remotely from the high voltage transformer and includes a low voltage transformer connected between the high voltage transformer and a power grid. The low voltage transformer is connected to the nacelle and provides it with low voltage power.

15 Claims, 5 Drawing Sheets

AUXILIARY POWER SUPPLY FOR A WIND TURBINE

FIELD OF THE INVENTION

The present invention relates to an auxiliary power supply and more particularly, to an auxiliary power supply for use with a wind turbine.

BACKGROUND OF THE INVENTION

Windmills have been in use throughout the world for generations harnessing the power of the wind. The windmill performs functions such as pumping water or grinding flour. A wind turbine is a windmill that converts the energy of the wind into a viable source of electrical power.

In an existing wind turbine, the shaft of the turbine is connected to a generator located in the nacelle of the wind turbine. The generator is in turn connected to a high voltage transformer, typically located at the base of the tower of wind turbine. The high voltage transformer is connected to the generator by cables which are located in the tower. The high voltage transformer converts the electrical power from the generator into higher voltages. The output from the high voltage transformer is then connected directly into a utility's power grid.

A source of 120/240V AC power at the nacelle of the wind turbine is beneficial because it gives the utility company the ability to provide lighting to assist maintenance personnel. Additionally, this 120/240V AC power source allows the utility company to change the pitch of the turbine blades even though the turbine is not generating electricity. One way to provide such an AC power source is to connect a separate low voltage transformer to the output of the generator. The low voltage transformer taps off the connection between the generator and the primary winding of the high voltage transformer. With this connection, the low voltage transformer provides 120/240V AC power when the generator is generating electricity and when the generator is not on line as long as the high voltage transformer remains connected to the power grid. By back feeding the low voltage transformer from the power grid, 120/240V AC power is available to assist the craftsperson during wind turbine maintenance periods.

In another wind turbine design, the high voltage transformer is located in the nacelle and there is no low voltage transformer. A craftsperson would have to bring a portable generator in order to provide a 120/240V AC power when performing work at the tower. The generator would have to be located at the base of the tower in a well vented location.

In yet another wind turbine design, the generator and high voltage transformer are located in the nacelle of the turbine and a separate low voltage transformer is located at the bottom of the tower. In this design, low voltage wires are run from the connection between the generator and the primary side of the high voltage transformer to the low voltage transformer. High voltage wires in the tower connect the high voltage transformer to the power grid. Locating the high voltage transformer in the nacelle of the turbine creates some difficulties. Typically, the ability to take the high voltage transformer off line is performed by operating a switch at the high voltage transformer. When the transformer is in the nacelle of the wind turbine, this switching function must remain at or near the base of the tower to allow the utility company to easily disconnect the transformer from the power grid.

When the high voltage transformer is energized, the high voltage wires in the tower of the wind turbine are also energized. These energized cables create a potential risk of electrocution to utility personnel who may be present in the tower of the wind turbine. As a result, when the utility company requires maintenance to be performed at the tower, the high voltage transformer is disconnected from the grid. By disconnecting the high voltage transformer from the grid, any low voltage transformer that is connected between the generator and the primary winding of the high voltage transformer is disabled. With the low voltage transformer disabled, there is no 120/240V AC power for the nacelle.

The present invention is designed to overcome these limitations as well as provide a cost effective solution to isolate and protect the turbine's high voltage transformer when the high voltage transformer is connected into the utility company's power grid.

SUMMARY OF THE INVENTION

A wind turbine comprising:
a nacelle;
a generator located inside said nacelle;
a high voltage transformer which is located inside said nacelle and is connected to said generator and to a power grid; and,
a low voltage power supply source which is located remotely from said high voltage transformer and comprises a low voltage transformer connected between said high voltage transformer and said power grid, said low voltage transformer being further connected to and provides with low voltage power said nacelle.

BRIEF DESCRIPTION OF THE DRAWINGS

The invention is further described in the detailed description that follows, by reference to the noted drawings by way of non-limiting illustrative embodiments of the invention, in which like reference numerals represent similar elements throughout the several views of the drawings, and wherein.

DETAILED DESCRIPTION OF ILLUSTRATIVE EMBODIMENTS

Figure 1:
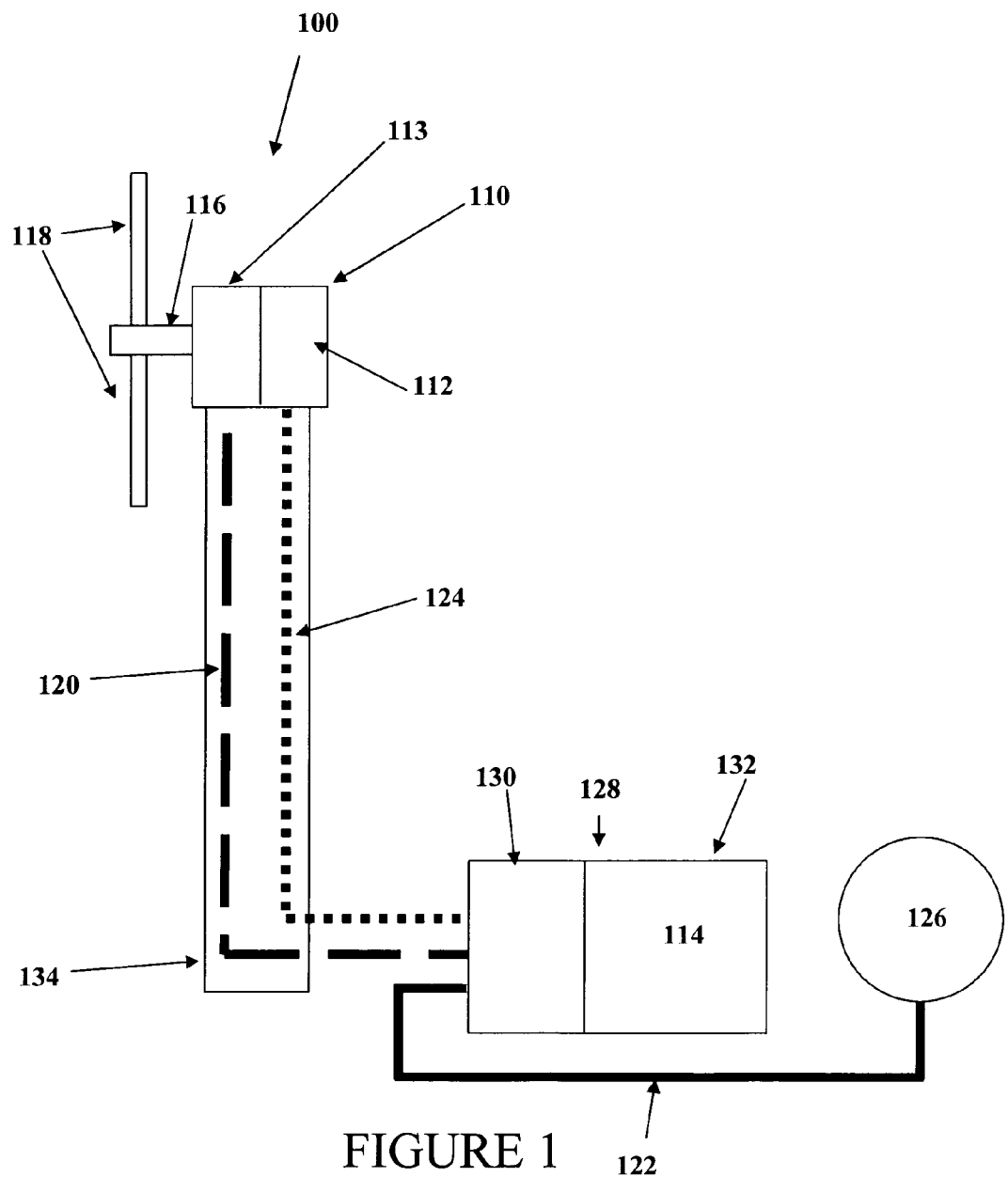
FIG. 1 illustrates a wind turbine system embodied in accordance with the present invention.

FIG. 1 illustrates a wind turbine 100 embodied in accordance with the present invention. The wind turbine 100 consists of blades 118 attached radially to a shaft 116, which in turn is connected to a generator 113 housed in the nacelle 110 of the turbine 100. When the shaft 116 rotates, the generator 113 generates electricity. The output of the generator 113 is connected to a high voltage dry type transformer 112 which is also housed in the nacelle 110. Since the transformer 112 is located close to the generator 113, the wiring and its associated potential hazards are reduced. The output from the dry type transformer 112 is connected to an enclosure 128 located at the base of the turbine 100 by high voltage wires 124 which are in the tower 134. Power grid wires 122 connect the enclosure 128 to the utility power grid 126. One example of such a high voltage dry type transformer 112 is a 1.8 MVA three-phase, 34500 GrdY/19920 transformer with an impedance of 5.75%, and a current rating of 30.12 Amps manufactured by Vestas Wind Systems A/S.

The enclosure 128 is typically mounted on a concrete pad and has an oil filled compartment 132 and a compartment 130 which is accessible by utility company maintenance personnel. These types of enclosures are generally designed to conform to industry standards and in this case, the enclosure 128 conforms to ANSI Standard C57.12.26. Within the accessible compartment 130, all of the wiring to the tower 134 and power grid 126 is attached to the high voltage, power grid and low voltage dead front connectors 318, 320 and 322, respectively. The connectors 318, 320, 322 are shown in FIG. 3B. The dead front connectors 318, 320, and 322 provide the electrical connection between the auxiliary transformer 114 and other components located in the oil filled compartment 132 and the outside environment. For example, from the low voltage dead front connectors 322, the output of the auxiliary transformer 114 is connected by low voltage wires 120 to the nacelle 110 of the wind turbine 100. In the embodiment shown in FIG. 1, the auxiliary transformer 114 is an oil immersed 112.5 kVA three phase transformer with 2% impedance manufactured by ABB Inc., assignee of the present invention.

Figure 2A:
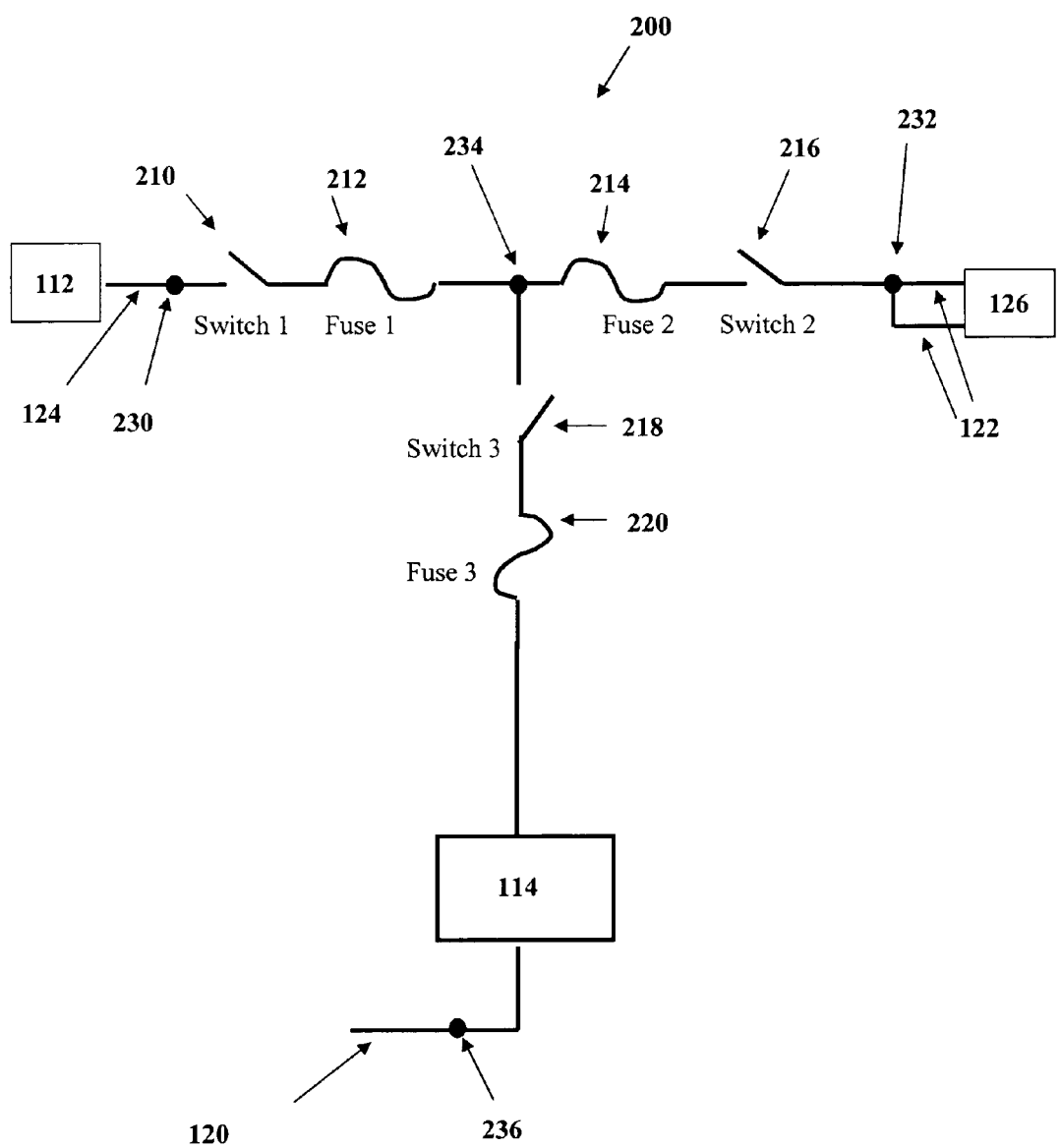
FIG. 2A shows the circuit schematic for one embodiment of a power supply used in the wind turbine system of FIG. 1.

FIG. 2A shows a circuit schematic for one embodiment of the power supply 200 housed in the oil filled compartment 132 of the enclosure 128. This circuit is a three phase circuit but for ease of illustration only one phase is shown. The other two phases are identical. The power supply 200 includes the auxiliary transformer 114 and the associated protection and switching elements 210, 212, 214, 216, 218 and 220 all of which are located in the oil filled compartment 132. The oil in the oil filled compartment 132 not only provides the dielectric properties necessary to contain arcing associated with the switching elements 210, 216, 218 of the power supply 200, but also provides cooling for the auxiliary transformer 114. Either mineral oil or vegetable oil can be used in the oil filled compartment 132.

The high voltage wire 124 from the dry type transformer 112 in the nacelle 110 of the wind turbine 100 is connected to the high voltage dead front connector 320 at high voltage junction 230 located in the accessible compartment 130. The high voltage junction 230 is electrically connected to the first current interrupting element 210 which is connected by the first fault protection element 212 to a junction 234.

The first current interrupting element 210 provides electrical isolation for the electricity generated by wind turbine 100 from the rest of the power supply 200. One device used for the first current interrupting element 210 is a LBOR (Load Break Oil Rotary) switch. In one embodiment for power supply 200, a 300A, 150 BIL with a 38 kV rating LBOR switch manufactured by ABB Inc., the assignee of the present invention is used with the previously mentioned 1.8 kVA dry type transformer 112.

The first fault protection element 212 provides low current fault protection for the dry type transformer 112. One example of a first fault protection element 212 is a 50A, 23 kV dual sensing bay-o-net expulsion fuse manufactured by Cooper Industries. When this 50A expulsion fuse clears, gas is expulsed into the oil and the circuit opens. The 50A bay-o-net fuse also clears when the temperature of the oil reaches temperatures in excess of 120° C.

The junction 234 is connected to the power grid junction 232 by the series combination of the second fault protection element 214 and the second current interrupting element 216. Power grid junction 232 is the electrical equivalent to the power grid dead front connectors 318 located in the accessible compartment 130 of the enclosure 128. From the power grid junction 232, the power grid wiring 122 connects to the power grid dead front connectors 318 and connects the power supply 200 to the power grid 126.

The second fault protection element 214 is selected to protect the dry type transformer 112 from high current faults. These high current faults are generally in the magnitude of several hundred amps to several thousand amps. In the embodiment shown in FIG. 2A, a "Shorty" 130A 23 kV PRCL (Partial Range Current Limiting) fuse manufactured by HiTech Industries is used for the second fault protection element 214.

The second current interrupting element 216 provides the ability to isolate the power supply 200 from the power grid 126. By using the second current interrupting element 216 to isolate the power supply 200 from the power grid 126, the utility company can continue to provide 120/240V AC power to the turbine 100 while repairs or maintenance functions are performed on the power grid 126 or the power grid wiring 122. In this embodiment, the operating characteristics of the second current interrupting element 216 are very similar to the first current interrupting element 210. Since the requirements are approximately the same, the LBOR switch used for the first current interrupting element 210 is used for the second current interrupting element 216.

Junction 234 is connected to junction 236 by the series combination of a third current interrupting element 218 and a third fault protection element 220 to the auxiliary transformer 114. The auxiliary transformer 114 converts the high voltage supplied from either the dry type transformer 112 or the power grid 126 into 120/240V AC. The output of the auxiliary transformer 114 is connected to junction 236.

The third current interrupting element 218 electrically isolates the auxiliary transformer 114 from both the power grid 126 and the high voltage transformer 112. For safety reasons, the auxiliary transformer 114 is disconnected from the power grid 126 and the high voltage transformer 112 when a fuse need to be replaced or other maintenance functions are performed. The amount of current flowing through the third current interrupting element 218 is less than the current flowing through first current interrupting element 210 or the second current interrupting element 216. For this reason a smaller 200A, 125 BIL and a rating of 27 kV LBOR switch manufactured by ABB Inc., the assignee of the present invention is used.

The third fault protection element 220 provides the low current fault protection for the auxiliary transformer 114 as well as high temperature protection. In the embodiment shown in FIG. 2A, a 3A bay-o-net fuse may be used for the third fault protection element 220. Alternatively should there be a space issue, a physically smaller fuse such as a 5A Dual Element fuse manufactured by Kearney Industries may also be used. The Kearney 5A Dual Element fuse has roughly the same operating characteristics as the 3A bay-o-net fuse. As the auxiliary transformer 114 conducts higher amounts of current, the operating temperature of the auxiliary transformer 114 and the temperature of the oil within the oil filled compartment 132 both rise. When the temperature of the oil reaches the temperature threshold of the third fault protection element 220, approximately 120° C., the fuse clears and the circuit opens.

Junction 236 is the electrical equivalent to the low voltage dead front connectors 322 located in the accessible compartment 130 of the enclosure 128. At the low voltage dead front connectors 322, the low voltage wiring 120 is connected and routed back up the tower 134 and into the nacelle 110 of the turbine 100 to provide a source of 120/240V AC power.

As previously described, two different fault protection elements 212, 214 are connected in series to protect the transformer 112. The first fault protection element 212 protects the transformer 112 from low current faults. Typically a low current fault occurs when the dry type transformer 112 is wired incorrectly, i.e. a primary winding is shorted to ground. Another instance of a typical low current fault occurs when two phases are shorted together. When a low current fault occurs, the electrical current conducted between junction 230 and power grid junction 232 may reach the transformer fault current value for that particular transformer. The transformer fault current value for the one example of the dry type transformer 112 described above is 524A. The fault current value is determined by the manufacturer as part of the specifications for the transformer. A low current fault protection element provides the fault protection for current values equal to or less than the transformer fault current value.

A high electrical current fault occurs when the transformer 112 fails. When the transformer 112 fails, there is no impedance between the primary and secondary windings of the transformer 112. The resulting short between the windings of the transformer 112 causes high amounts of current to flow. With respect to the embodiment shown in FIG. 2A, when the transformer 112 fails, the amount of electrical current that flows between junction 230 and 232 exceeds the fault current value for the transformer 112. When this happens, the low current fault protection element 212 may not be able to clear in time to prevent significant damage to the power grid 126. Therefore, the second fault protection element 214 is provided to protect the power grid 126 from the high currents that flow when transformer 112 fails.

In order to select the proper electrical current fault protection for the auxiliary transformer 114, the auxiliary transformer's fault current value is identified from the manufacturer's specifications. For the embodiment shown in FIG. 2A, the transformer fault current value for the one example of the auxiliary transformer 114 described above is 94A. Any fault current equal to or less than 94A is considered a low current fault. As discussed previously, the 3A bay-o-net fuse or the 5A Kearney Dual Element fuse provides low current fault protection for the third fault protection element 220.

The second fault protection element 214 is also used to protect the power grid 126 should the auxiliary transformer 114 fail. The second fault protection element 214 clears if either the dry type transformer 112 or the auxiliary transformer 114 experiences a failure. Using the same high current fault protection device 214 for both the dry type transformer 112 and the auxiliary transformer 114 is an efficient way to provide high current fault protection without the added expense of providing another fuse.

Figure 2B:
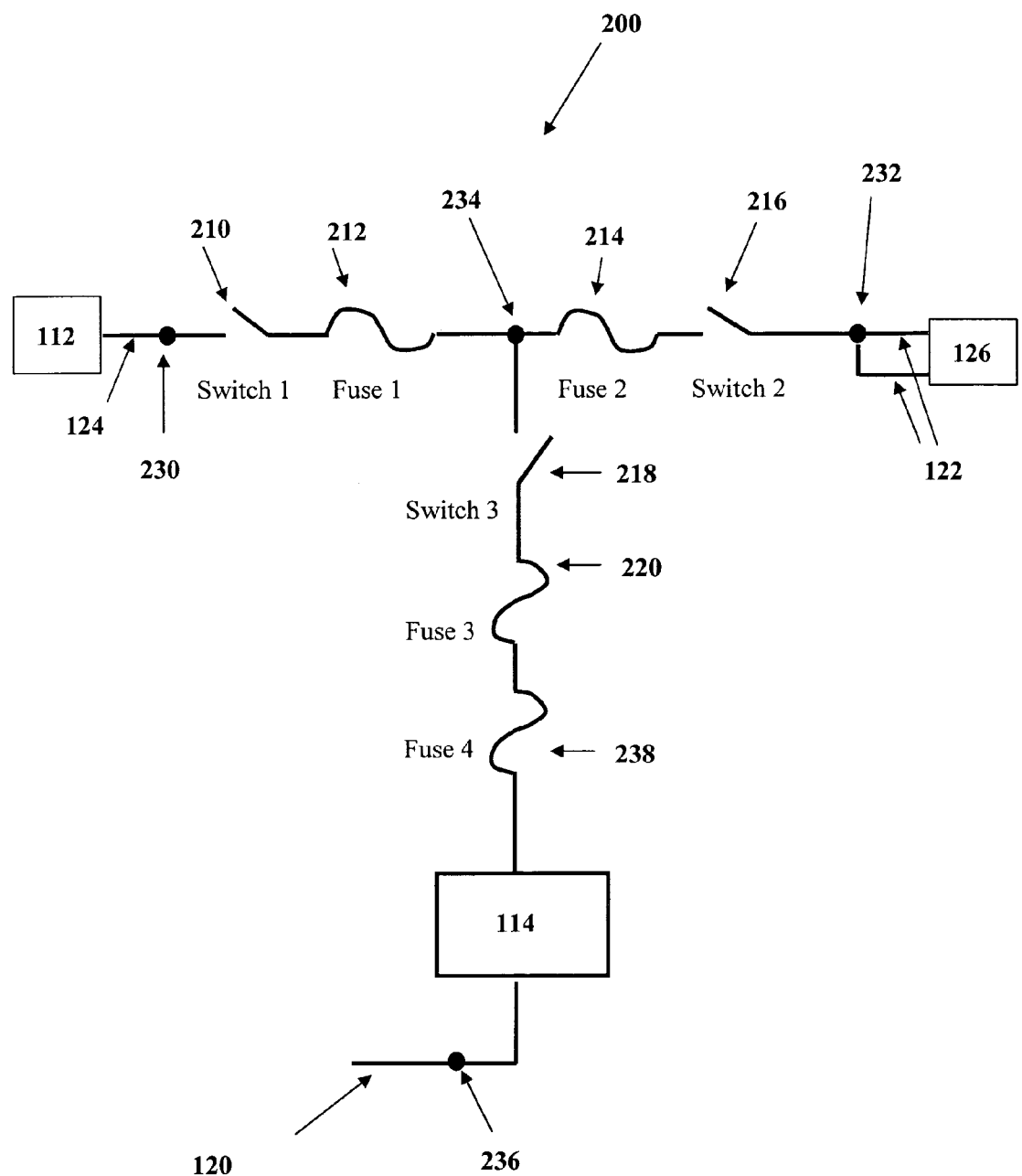
FIG. 2B shows the circuit schematic for an alternative embodiment of the power supply.

An alternative embodiment for the power supply 200 is shown in FIG. 2B. In this embodiment a fourth fault protection element 238 is connected in series between the third fault protection element 220 and the auxiliary transformer 114. The fourth fault protection element 238 provides added electrical current fault protection for the auxiliary transformer 114. In this embodiment, a fuse model #9F54DCA901 manufactured by General Electric is used as the fourth fault protection element 238. The fourth fault protection element 238 also clears should the temperature of the oil exceed the threshold of 120° C.

Electrical current characteristic curve graphs are commonly used by those skilled in the art to choose the proper current fault protection devices. These graphs illustrate the response characteristics of different fault protection devices. The graphs show certain characteristics of the transformer that is protected by the fault protection devices. The characteristics of the transformer that are graphed include, but are not limited to, rated current, maximum fault current, and inrush current. By graphically displaying the transformer information along with the fault protection information of each of the fuses, one of ordinary skill in the art can determine if the fault responsiveness of a particular fuse or collection of fuses will adequately protect a particular transformer.

Figure 4:
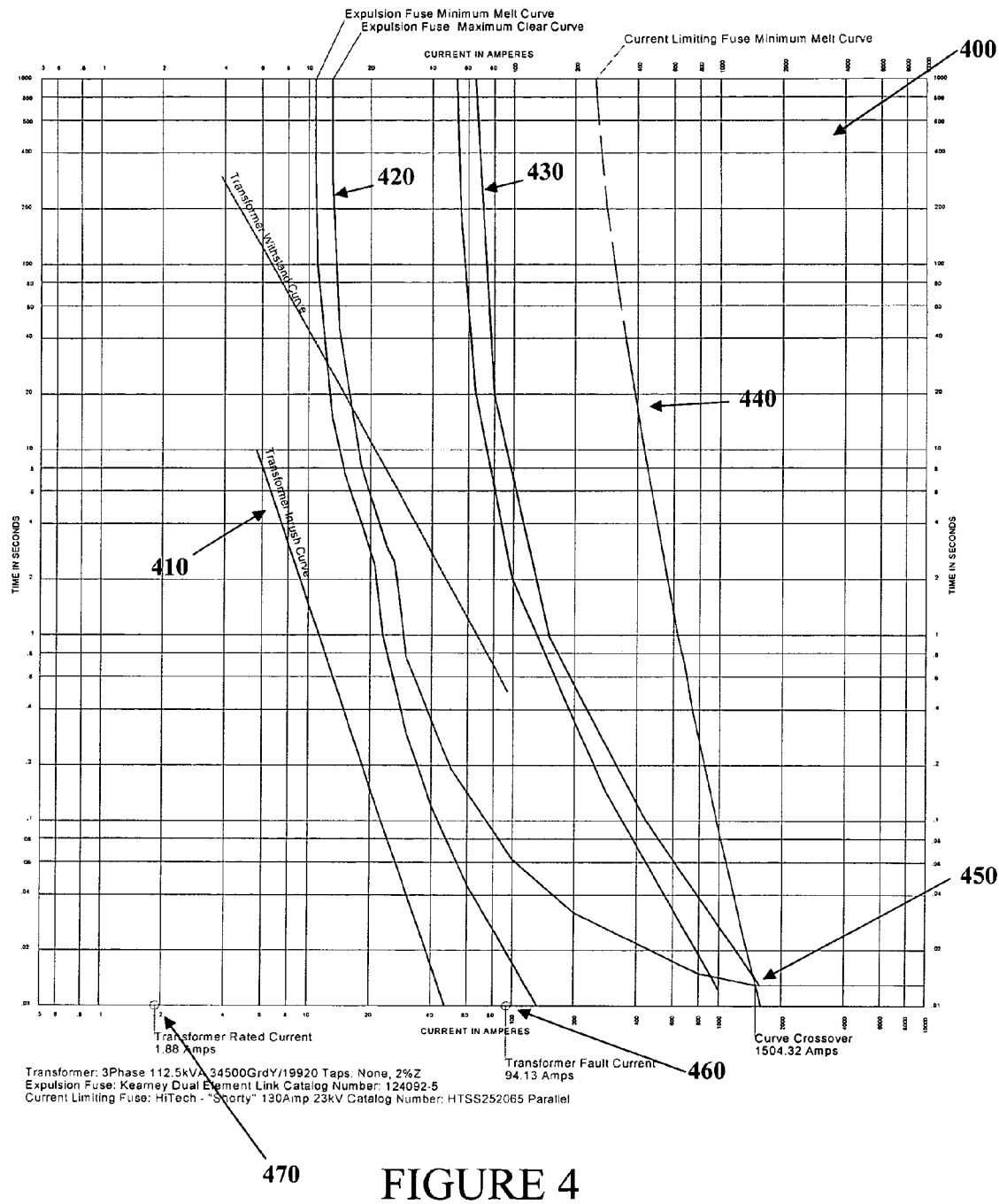
FIG. 4 illustrates current response curves associated with the present invention.

FIG. 4 shows an electrical current response graph 400 displaying response curves related to the protection of the auxiliary transformer 114 for the embodiment of the power supply 200 shown in FIG. 2B. The curves and particular values shown in the current response graph 400 are for the previously described examples of the dry type transformer 112 and auxiliary transformer 114 and the particular fuses used for the fault protection elements and thus may be different for other examples for those transformers and fault protection elements. The X-axis for the electrical current response graph 400 is the amount of current flowing through the transformer 114 and is displayed in Amperes. The Y-axis is the amount of time the current is flowing through the transformer 114 and is displayed in seconds. For the electrical current response graph 400 the values of current versus time are graphed logarithmically. On the electrical current response graph 400, the transformer rated current is shown at 470. This is the typical amount of current the transformer 114 will conduct during normal operations. The fault current of 94 amperes for transformer 114 is shown at 460.

The auxiliary transformer inrush current characteristic is displayed at 410. The transformer inrush current is the amount of current that flows through the transformer 114 when the transformer 114 is initially brought on line. FIG. 4, shows that the moment transformer 114 is brought on line, the inrush current is about 50 amperes. As current flows through the transformer 114, the transformer windings become energized and the impedance increases. As the impedance increases, the inrush current decreases. After about 10 seconds, the transformer is fully energized and no more current will be conducted due to the inrush properties of the transformer 114. When selecting fault protection elements, it is important that fuses with response characteristics greater than the inrush current curve 410 are selected. Otherwise, the fuse clears while the auxiliary transformer 114 is energizing and the transformer 114 never begins its normal operation.

The response curve for the Kearney Dual element fuse used as the third fault protection element 220 is shown at 420. The curve characteristics of the GE Fuse used as the fourth fault protection element 238 is shown at 430, while the curve characteristics for the Shorty PRCL fuse used as the second fault protection element 214 is shown at 440.

The electrical current response graph 400 shows the third fault protection element response curve 430 crossing the second fault protection element response curve 440 at crossover point 450. The crossover point for a typical low current fault/high current fault protection scheme should occur at approximately the fault current value 460 for transformer 114. However the high current fault protection device (second fault protection element 214) was chosen based on the dry type transformer 112 characteristics. Therefore the cross over point 450 is much higher than would be expected for an auxiliary transformer 114 as described previously in the one example.

To provide additional fault protection nearer to the transformer fault current 460, the fourth fault protection element 238 is used. As is shown in FIG. 2B, the fourth fault protection element 238 is connected in series between the third fault protection element 220 and the auxiliary transformer 114. The protection configuration shown in FIG. 2B is intended to ensure that either the third fault protection element 220 or the fourth fault protection element 238 will clear at or near the transformer fault current 460.

Figure 3A:
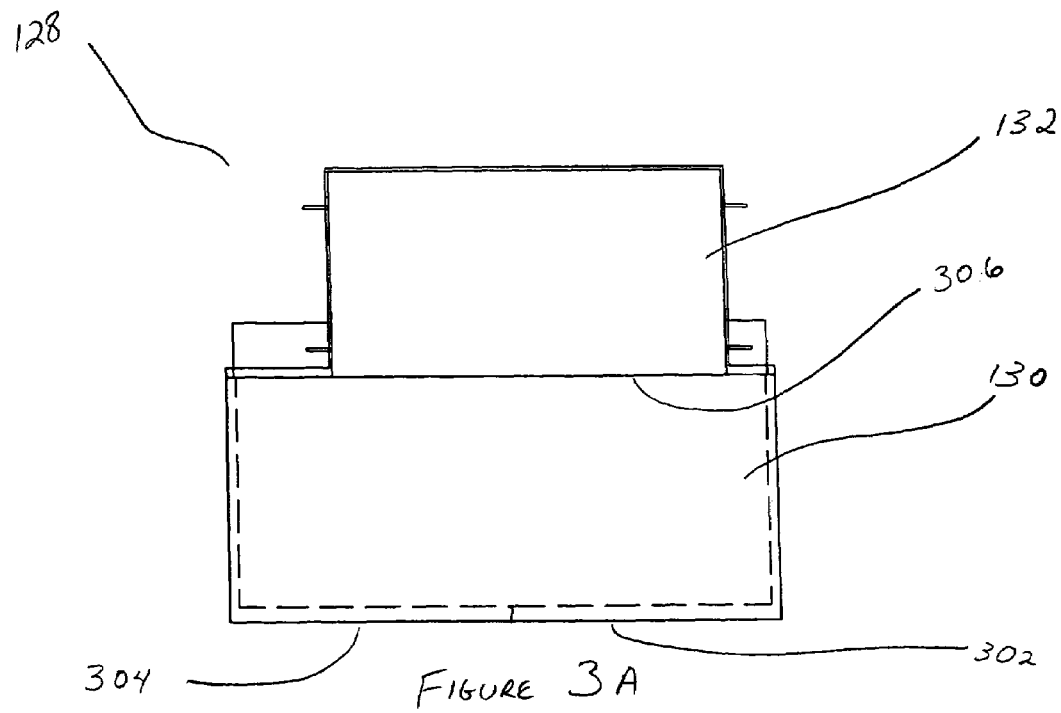
FIG. 3A illustrates a top view of an enclosure associated with the power supply.
Figure 3B:
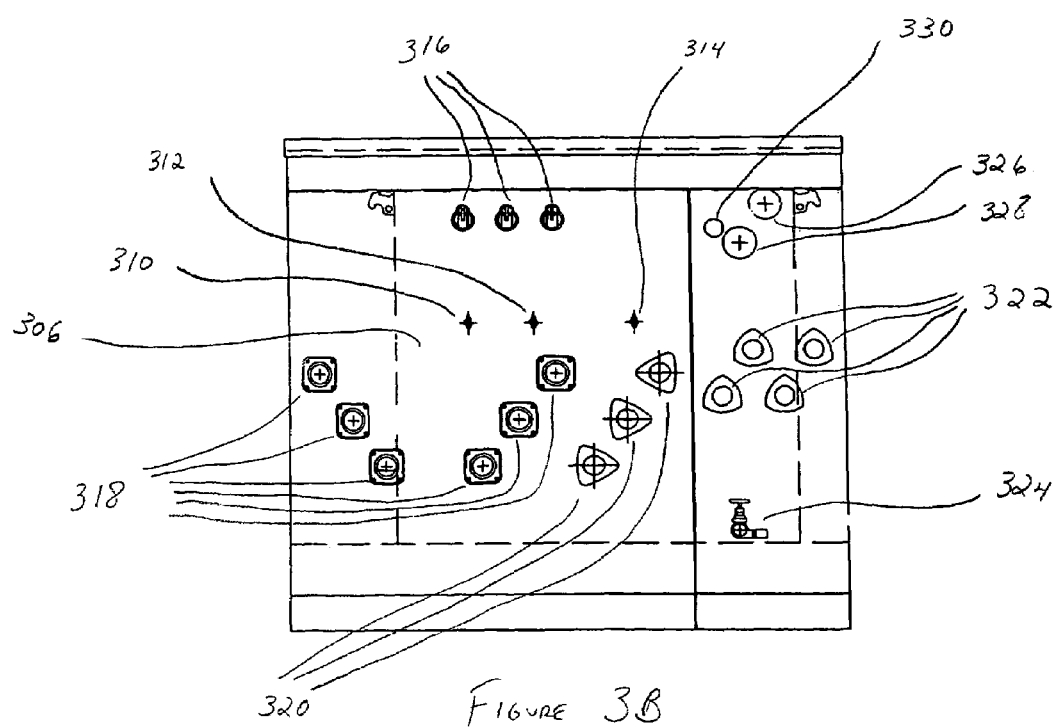
FIG. 3B illustrates a front view of the enclosure.

FIG. 3A shows a top view of the enclosure 128. At the front of the enclosure is the accessible compartment 130, and at the rear of the enclosure 128 is the oil filled compartment 132. The accessible compartment 130 has a right door 302 and a left door 304. These doors can be locked and unlocked by utility company maintenance personnel. The low voltage wiring 120, the high voltage wiring 124 and the power grid wiring 122 are brought up through the floor of the accessible compartment 130. In between the accessible compartment 130 and the oil filled compartment 132 is a shared wall 306 of the enclosure 128.

FIG. 3B shows a front view of the enclosure 128 with the left door 304 and right door 302 removed. Mounted on the shared wall 306, are the dead front connectors 318, 320, 322 as well as the toggle switches 310, 312, 314, the bay-o-net fuse holders 316, a valve 324, a plug 330, a temperature gauge 326 and a pressure gauge 32.

The first toggle switch 310 is connected to the first interrupting element 210. The operation of the first current interrupting element 210 is controlled by the first toggle switch 310. If the first current interrupting element 210 is closed, a craftsperson would physically move the first toggle switch 310 from a first position to a second position to open element 210. To subsequently close the first current interrupting element 210 the crafts person would move the first toggle switch 310 from the second position to the first position.

The second current interrupting element 216 is controlled by the second toggle switch 312. In order to open or close the second current interrupting element 216, the second toggle switch 312 is operated in the same manner as described above for the first toggle switch 310. Similarly, the third toggle switch 314 controls the operation of the third current interrupting element 218 and is also operated the same way as the first toggle switch 310.

The bay-o-net fuse used for the first fault protection element 212 is housed in the bay-o-net fuse holder 316. As shown in FIG. 3B, there are three fuses holders 316, one for each phase of the power supply 200. The typical bay-o-net fuse holder has a fault identification mechanism to allow a craftsperson to quickly identify if a fuse has cleared. To replace a cleared fuse, the craftsperson opens the fuse holder, removes the cleared fuse and replaces the fuse.

The high voltage wiring 124 connects to the high voltage dead front connectors 320. As was previously described, the high voltage dead front connector 320 provides the electrical connectivity between the dry type transformer 112 and the power supply 200. The high voltage dead front connectors 320 are the electrical equivalent of junction 230. The power grid wiring 122 attaches to the power grid dead front connectors 318 and connects the power supply 200 with the power grid 126. The low voltage wiring 120 attaches to the low voltage dead front connectors 322. The high voltage wires 124, the low voltage wires 120 and the power grid wires 122 have right angle connectors which allow easy attachment to their respective dead front connectors 320, 322, and 318.

Mounted on the shared wall 306 of the enclosure 128 are several gauges. A craftsperson can determine the present temperature and pressure in oil filled compartment 132 by observing the temperature gauge 326 and the pressure gauge 328. The gauges 326, 328 allow the craftsperson to identify if the conditions are safe enough to open the oil filled compartment 132. The enclosure 128 also has a valve 324 to expedite the removal of oil from the oil filled compartment 132 and a plug 330 to add oil if the oil filled compartment 132 is low on oil.

It is to be understood that the foregoing description has been provided merely for the purpose of explanation and is in no way to be construed as limiting of the invention. Where the invention has been described with reference to embodiments, it is understood that the words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A wind turbine for connection to a power grid, the wind turbine comprising:
a rotatable shaft;
blades attached to said rotatable shaft;
a nacelle;
a generator connected to said rotatable shaft and located inside said nacelle;
a high voltage transformer which is located inside said nacelle and is connected to said generator and to said power grid;
an enclosure located below said nacelle; and
a low voltage power supply disposed n said enclosure and connected to said nacelle to provide low voltage power to said nacelle, said low voltage power supply comprising a low voltage transformer connected both to said high voltage transformer and to said power grid, a first fault protection element connected between said high voltage transformer and said low voltage transformer, a first current interrupting element connected between said first fault protection element and said high voltage transformer, and a second fault protection element connected between the power grid and the first fault protection element.

2. A wind turbine as in claim 1 wherein said low voltage power supply further comprises a second current interrupting element connected between the power grid and the second fault protection element.

3. A wind turbine as in claim 2 wherein said low voltage power supply further comprises a third current interrupting element which is connected between the low voltage transformer and the first current interrupting element and between the low voltage transformer and the second current interrupting element.

4. A wind turbine as in claim 3 wherein said low voltage power supply further comprises a third fault protection element connected between the low voltage transformer and the third current interrupting element.

5. A wind turbine as in claim 4 wherein said low voltage power supply further comprises a fourth fault protection element connected between the third fault protection element and the low voltage transformer.

6. A wind turbine as in claim 4 wherein said enclosure comprises a compartment filled with oil, and wherein the low voltage transformer, the first, second and third fault protection elements and the first, second and third current interrupting elements are all immersed in the oil in the compartment.

7. A wind turbine as in claim 1 wherein the high voltage transformer is a dry type transformer.

8. A low voltage power supply for providing low voltage power to a wind turbine connected to a power grid, the wind turbine comprising a generator connected to a high voltage transformer, the low voltage power supply comprising:
    an enclosure having a first compartment filled with oil and a second compartment comprising: a low voltage connector for connection to a wire for providing low voltage power to the wind turbine, a high voltage connector for connection to the high voltage transformer and a power grid connector for connection to the power grid; and
    a power circuit disposed in the first compartment filled with oil, the power circuit comprising:
        a low voltage transformer having an input connected to the high voltage connector and an output connected to the low voltage connector;
        a first current interrupting element connected between the high voltage connector and the input of the low voltage transformer;
        a second current interrupting element connected between the power grid connector and the input of the low voltage transformer; and
        a third current interrupting element connected between the input of the low voltage transformer and the first current interrupting element and between the input of the low voltage transformer and the second current interrupting element.

9. The low voltage power supply of claim 8, wherein the power circuit further comprises first and second fault protection elements connected in series between the first and second current interrupting elements, the first and second fault protection elements having different current ratings.

10. The low voltage power supply of claim 9, wherein the first fault protection element is connected between the first current interrupting element and the third current interrupting element, and the second fault protection element is connected between the second current interrupting element and the third current interrupting element, and wherein the second fault protection element has a higher current rating than the first fault protection element.

11. The low voltage power supply of claim 10, wherein the power circuit further comprises a third fault protection element connected between the third current interrupting element and the low voltage transformer, the third fault protection device having a current rating lower than the current ratings of both the first and second fault protection devices.

12. The low voltage power supply of claim 11, wherein the first, second and third fault protection elements each comprise a current limiting fuse.

13. The low voltage power supply of claim 12, wherein the first, second and third current interrupting elements each comprise a load break oil rotary switch.

14. A method of providing a wind turbine with low voltage power, the wind turbine being connected to a power grid and comprising a nacelle and a generator connected to a high voltage transformer, the method comprising:
    (a.) providing a power supply comprising:
        an enclosure having a first compartment filled with oil and a second compartment comprising: a low voltage connector, a high voltage connector and a power grid connector; and
        a power circuit disposed in the first compartment filled with oil, the power circuit comprising:
            a low voltage transformer having an input connected to the high voltage connector and an output connected to the low voltage connector;
            a first current interrupting element connected between the high voltage connector and the input of the low voltage transformer;
            a second current interrupting element connected between the power grid connector and the input of the low voltage transformer; and
            a third current interrupting element connected between the input of the low voltage transformer and the first current interrupting element and between the input of the low voltage transformer and the second current interrupting element;
    (b.) disposing the power supply below the nacelle;
    (c.) connecting the low voltage connector to the nacelle to provide the nacelle with low voltage power from the low voltage transformer;
    (d.) connecting the high voltage connector to the high voltage transformer; and
    (e.) connecting the power grid connector to the power grid.

15. The method of claim 14, wherein the power circuit further comprises first and second fault protection elements connected in series between the first and second current interrupting elements, the first and second fault protection elements having different current ratings.

* * * * *